Feb. 14, 1967    D. KIOUZES-PEZAS    3,304,154
PROCESS FOR PRODUCING SPHEROIDAL ALKALINE
EARTH METAL CARBONATES
Filed Feb. 17, 1964
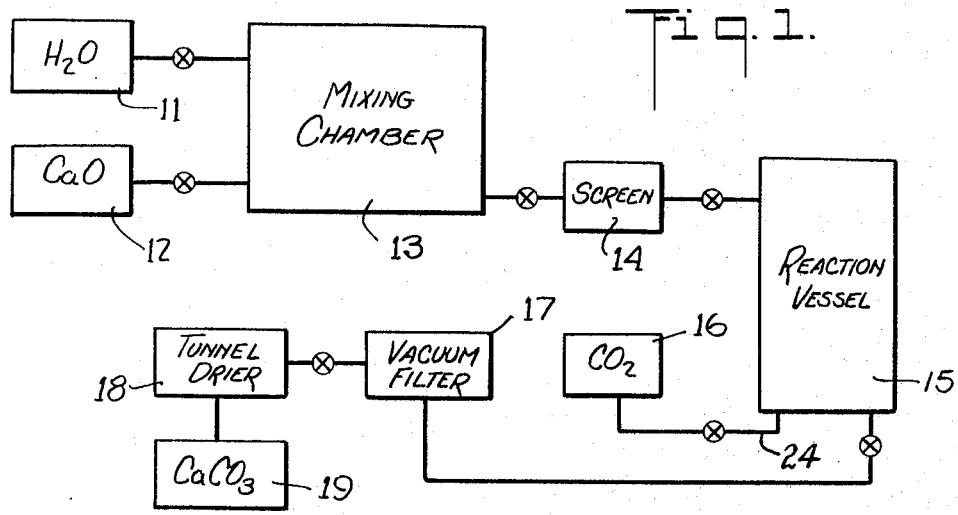
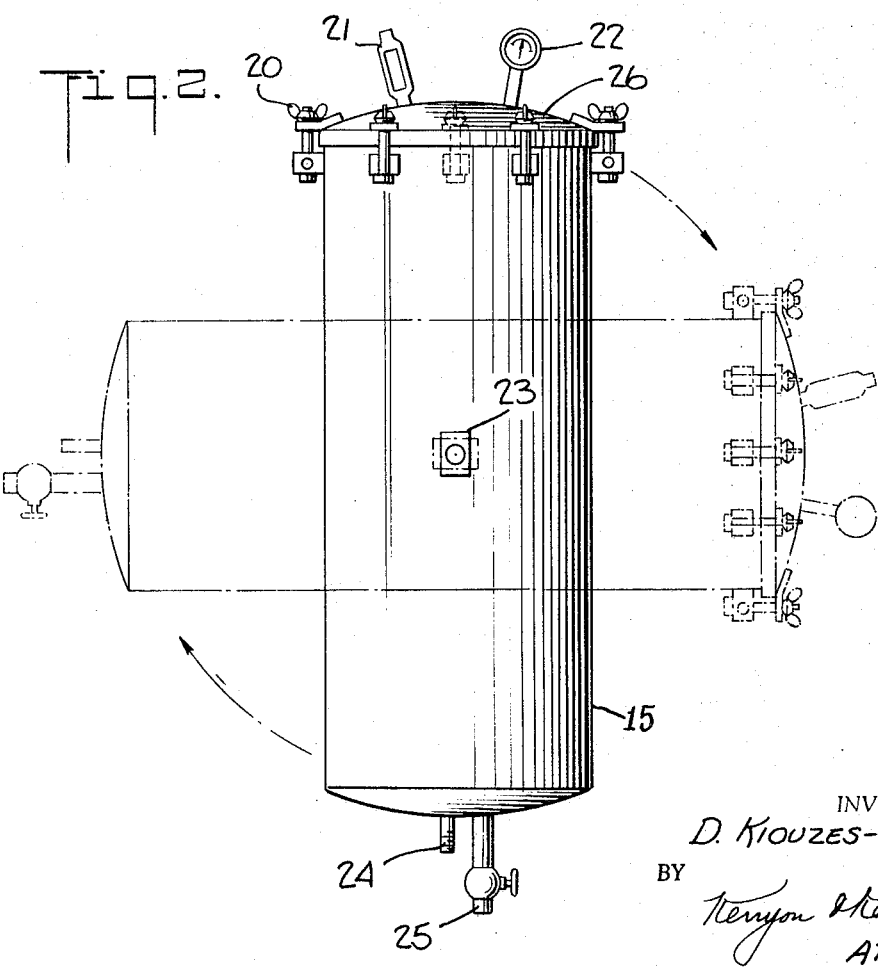
INVENTOR.
D. KIOUZES-PEZAS
BY
Kenyon & Kenyon
ATTORNEYS

United States Patent Office 3,304,154
Patented Feb. 14, 1967

3,304,154
PROCESS FOR PRODUCING SPHEROIDAL ALKALINE EARTH METAL CARBONATES
Dimitrios Kiouzes-Pezas, 1D Santarosa St., Athens, Greece
Filed Feb. 17, 1964, Ser. No. 345,175
14 Claims. (Cl. 23—66)

This invention relates to a method for making alkaline earth metal carbonates, particularly calcium carbonate, and more particularly for making non-colloidal calcium carbonate in the form of finely divided generally spheroidal particles.

Very finely divided calcium carbonate has many uses in industry. In the paper industry it is used as a filler and in coatings to enhance the whiteness and brightness and opacity of paper. It finds use in the rubber industry as a reinforcing agent, since it increases the tensile strength, tear resistance and other properties of rubber when added in proper amounts. It is used as a pigment in paints, enamels, lacquers, printing inks and as a filler and pigment in linoleum and leather. The toothpaste industry uses it as a polishing agent in toothpaste and it is also used in making creams, powders and lipsticks.

Over the years a great many processes have been developed to make calcium carbonate. The most direct and easiest method is to allow carbon dioxide to come into contact with a calcium hydroxide suspension as illustrated in U.S. Patent No. 2,198,640 (Stump). Most processes that have been developed have been concerned with the production of very fine precipitated calcium carbonate. The finer the particles of calcium carbonate, the more uses the product has in industry.

None of the known methods of making calcium carbonate produces generally spheroidal particles, as is the case with my process. In fact, one of the main characteristics of my invention is that the particles obtained through it have the most closely spherical shape heretofore known, as well as a much greater specific surface.

The importance of the spheroidal particle shape stems from its pronounced effect on the flow characteristics of the product and of increased hiding power, since spheroidal particles roll better and when they are mixed with other material, they facilitate the dispersion; on the other hand, they have a much greater surface area than any other crystal shape.

It is one object of this invention to make very finely divided particles of calcium carbonate in a relatively short period of time by means of an economical process.

It is another object of this invention to make calcium carbonate in the form of generally spheroidal particles.

The process and advantages of my invention will be more clearly understood from the following description, which is based upon the production of non-colloidal precipitated calcium carbonate.

FIG. 1 is a flow diagram of my process in block form.

FIG. 2 is a more or less detailed drawing of one form of apparatus which may be used in carrying out my process. It will be appreciated that the apparatus depicted is simple in form but can be modernized without departing from the principles of this invention. Thus, although this equipment can only be utilized in a batch process, it will be apparent that it may readily be modified so as to make the process continuous.

In general, calcium carbonate is produced according to my process by reacting a suspension of calcium hydroxide with carbon dioxide in a closed vessel under super-atmospheric pressure while rotating the said vessel, the concentration of calcium hydroxide and the temperature being kept between certain limits.

In this process, it is believed that most of the carbon dioxide dissolves in the calcium hydroxide suspension to form liquid carbonic acid, which then reacts with the calcium hydroxide to form calcium carbonate, according to the following reactions:

$$CO_2 + H_2O \rightarrow H_2CO_3$$
$$CaO + H_2O \rightarrow Ca(OH)_2$$
$$Ca(OH)_2 + H_2CO_3 \rightarrow CaCO_3 + 2H_2O$$

Some of the calcium hydroxide also reacts with carbon dioxide gas directly to form calcium carbonate, according to the following reaction, although the liquid phase reaction is more efficient than is this gas-phase reaction:

$$Ca(OH)_2 + CO_2 \rightarrow CaCO_3 + H_2O$$

The reaction vessel is usually filled to at least nine-tenths (90%) of its volume with the calcium hydroxide suspension; then, while maintaining a carbon dioxide pressure of from one to six atmospheres gauge in the vessel, the latter is rotated.

One apparatus which may be used in carrying out my process is shown in FIG. 2, which is a detailed drawing of a cylindrical autoclave. The autoclave 15 has been journalled by fixtures 23 for rotation about its horizontal axis. Safety valve 21 and pressure gauge 22 are mounted on one end of autoclave 15. The calcium hydroxide suspension may be introduced into the reaction vessel or autoclave through the top by unscrewing bolts 20 and removing top 26. An inlet pipe 24 for the introduction of carbon dioxide gas into the vessel is provided at the bottom of autoclave 15. The contents of the vessel may be emptied through outlet 25S. Although the capacity of this particular autoclave is 300 liters of water, my process is not limited to particular size autoclaves.

The following is a more detailed description of an example for carrying out my process.

19,200 grams of good quality calcium oxide 12 (FIG. 1) are mixed with 270 liters of water 11 in a container or mixing chamber 13 of some sort to make a suspension of calcium hydroxide. This particular proportion of water and calcium oxide are such so as to have 6.6 percent of calcium oxide by weight in the suspension as calcium hydroxide.

I have found that the concentration of calcium hydroxide in the suspension that gives the best results ranges from about 4% to 8% by weight per liter, calculated on the basis of calcium oxide content, the most preferable concentration being about 7%. Lower concentrations are undesirable for economic reasons, while higher concentrations adversely affect the size of the crystal by increasing it greatly.

The suspension is passed through a 200 mesh screen 14 to take out any large impurities that are present, and it is then transferred into the reaction vessel or autoclave 15 (see FIG. 2) by removing the top 26 of the autoclave.

The autoclave is then heated to about 60° C. and rotated for a few minutes. When the rotation is stopped, carbon dioxide 16 is introduced into the vessel through pipe 24 and is thereby bubbled through the suspension in the vessel until the pressure in vessel 15 reaches from about 4 to 6 atmospheres gauge, as shown on gauge 22, and preferably about 5 atmospheres gauge. When the 5 atmospheres gauge pressure is reached, the carbon dioxide line is disconnected from pipe 24, the latter is closed and the autoclave is rotated about its horizontal axis, at from 10 to 30 r.p.m., preferably at 20 r.p.m.

Vessel 15 is heated so as to maintain the temperature therein at about 75° C. The temperature should preferably be kept from 60° C. to 90° C. Temperatures much lower than 60° C. will produce a certain amount of colloidal calcium carbonate, which is undesirable for the reason that after drying, it presents dispersing difficulties.

Best results were obtained when the temperature was maintained in the range of 70° C. to 80° C.

When the gauge pressure in the autoclave drops to zero pressure, the rotation of the vessel is stopped and more carbon dioxide is introduced into the vessel until the pressure in the vessel again reaches about 5 atmospheres. The vessel is then again rotated until the pressure goes down to zero. This procedure is repeated until the pressure in the autoclave does not drop completely, e.g. it drops only to 1 or 2 atmospheres of gauge, thus indicating that all the calcium hydroxide has reacted to form calcium carbonate.

Usually eighteen to twenty of the above injections of carbon dioxide are needed to complete the reaction. Using my procedure, it takes about one hour for all the calcium hydroxide, to be converted to calcium carbonate, whereas by prior procedures, e.g. U.S. Patent No. 2,081,112 (Statham), it takes twenty hours to accomplish comparable results.

It has been found that by the addition to the calcium hydroxide suspension of 1–2% by weight (based upon the weight of calcium oxide used to form the suspension) of precipitated calcium carbonate, the particle size distribution of which is in the submicron area, may be used to affect and perhaps control the general characteristics of the batch so as to obtain only submicron size particles in the product.

It has been found that overcarbonation of the batch produces calcium bicarbonate, which is more soluble than calcium carbonate. When the bicarbonate is present in even small amounts, calicum carbonate will appear in the form of a relatively small number of large crystals, instead of in a large number of small crystals. This undesirable effect can easily be avoided during the process of my invention by means of keeping the pressure gauge under close control to prevent overcarbonation before the development of calcium bicarbonate.

When the reaction is complete, the contents of the autoclave 15 are removed therefrom and filtered through a vacuum filter 17. After filtering, the calcium carbonate is dried in tunnel drier 18. It should then be processed through a 325 mesh screen 19 before the product is stored for shipment, so as to maintain the generally spheroidal shape of the calcium carbonate particles. It is to be understood that this process can use any suitable filter and drier and is not limited to the type indicated above.

An analysis of some of the calcium carbonate produced by the above process indicated a settling volume of 52 cc. after twenty-four hours. The analysis further showed that the particles formed by my process are probably rhombohedral crystals which take the ultimate form of generally spheroidal particles.

This analysis of the calcium carbonate produced by the above process gave the following distribution of particle sizes:

| Particle size distribution: | Percent by wt. |
| --- | --- |
| From $0\mu$ to $1\mu$ | 24 |
| From $1\mu$ to $2\mu$ | 65.5 |
| From $2\mu$ to $3\mu$ | 9.5 |
| From $3\mu$ to $4\mu$ | 1.0 |

Although this invention has been described with reference to the production of generally spheroidal particles of calcium carbonate using certain types of apparatus, it should be appreciated that the type of apparatus and the detailed procedure described are not intended as limitations. Therefore, such modifications as fall within the spirit of the invention and scope of the appended claims, although not described herein, are also part of this invention.

What I claim is:

1. A method for producing non-colloidal calcium carbonate in finely divided, generally spheroidal form comprising the steps of introducing carbon dioxide into a reaction vessel containing a 4 to 8 percent, expressed in terms of weight of calcium oxide, aqueous suspension of calcium hydroxide until the pressure is from about 1 to 6 atmospheres gauge, rotating said vessel while maintaining the temperature in said vessel from about 60° C. to 90° C. and continuing to introduce carbon dioxide into said vessel until such time as the pressure stabilizes above zero gauge.

2. A method for producing non-colloidal calcium carbonate in finely divided, generally spheroidal form comprising the steps of introducing carbon dioxide into a reaction vessel containing a 7 percent, expressed in terms of weight of calcium, aqueous suspension of calcium hydroxide until the pressure is from about 1 to 6 atmospheres gauge, rotating said vessel while maintaining the temperature in said vessel from about 60° C. to 90° C. and continuing to introduce carbon dioxide into said vessel until such time as the pressure stabilizes above zero gauge.

3. A method for producing non-colloidal calcium carbonate in finely divided, generally spheroidal form comprising the steps of introducing carbon dioxide into a reaction vessel containing a 4 to 8 percent, expressed in terms of weight of calcium oxide, aqueous suspension of calcium hydroxide until the pressure is from about 1 to 6 atmospheres gauge, rotating said vessel while maintaining the temperature in said vessel about 75° C. and continuing to introduce carbon dioxide into said vessel until such time as the pressure stabilizes above zero gauge.

4. A method for producing non-colloidal calcium carbonate in finely divided, generally spheroidal form comprising the steps of introducing carbon dioxide into a reaction vessel containing a 4 to 8 percent, expressed in terms of weight of calcium oxide, aqueous suspension of calcium hydroxide until the pressure is from about 1 to 6 atmospheres gauge, rotating said vessel within the range of about 10 to 30 rotations per minute while maintaining the temperature in said vessel from about 60° C. to 90° C. and continuing to introduce carbon dioxide into said vessel until such time as the pressure stabilizes above zero gauge.

5. A method for producing non-colloidal calcium carbonate in finely divided, generally spheroidal form comprising the steps of introducing carbon dioxide into a reaction vessel containing a 4 to 8 percent, expressed in terms of weight of calcium oxide, aqueous suspension of calcium hydroxide until the pressure is about 5 atmospheres gauge, rotating said vessel while maintaining the temperature in said vessel from about 60° C. to 90° C. and continuing to introduce carbon dioxide into said vessel until such time as the pressure stabilizes above zero gauge.

6. A method for producing non-coloidal calcium carbonate in finely divided, generally spheroidal form comprising the steps and procedure of introducing carbon dioxide into a reaction vessel containing a 4 to 8 percent, expressed in terms of weight of calcium oxide, aqueous suspension of calcium hyroxide until the pressure is from about 1 to 6 atmospheres gauge, rotating said vessel while maintaining the temperature in said vessel from about 60° C. to 90° C. until the gauge pressure decays to zero at which point the rotation of the vessel is stopped and repeating the said procedure until the pressure stabilizes above zero gauge.

7. A method for producing non-colloidal calcium carbonate in finely divided, generally spheroidal form comprising the steps of introducing carbon dioxide into a reaction vessel containing a 4 to 8 percent, expressed in terms of weight of calcium oxide, aqueous suspension of calcium hydroxide which fills more than 90 percent of the internal volume of the vessel, until the pressure is from about 1 to 6 atmospheres gauge, rotating said vessel while maintaining the temperature in said vessel from about 60° C. to 90 C. and continuing to introduce carbon dioxide into said vessel until such time as the pressure stabilizes above zero gauge.

8. A method for producing non-colloidal calcium carbonate in finely divided, generally spheroidal form comprising the steps of preparing a suspension of calcium hydroxide by mixing sufficient calcium oxide with water so that a suspension with a concentration of about 7 percent by weight of calcium oxide is formed; filling more than 90 percent of the volume of a reaction vessel therewith; preheating the suspension to about 60° C.; then subjecting the suspension in the vessel to a procedure including introducing carbon dioxide gas at the bottom end of the vessel so that it passes through the suspension until the pressure within the vessel is about 5 atmospheres gauge, rotating the vessel about a horizontal axis at about 20 rotations per minute while maintaining the temperature therein at about 75° C. until the gauge pressure within the vessel decays to about zero, then stopping the rotation of the vessel; and repeating said procedure until the gauge pressure stabilizes at a pressure above zero.

9. A method for producing a non-colloidal alkaline earth metal carbonate in finely divided, generally spheriodal form comprising the steps of introducing carbon dioxide under pressure into a reaction vessel containing an aqueous suspension of an alkaline earth metal hydroxide and rotating the vessel until the pressure stabilizes above the zero gauge.

10. A method for producing a non-colloidal alkaline earth metal carbonate in finely divided, generally spheriodal form comprising the steps of introducing carbon dioxide under pressure into a reaction vessel containing an aqueous suspension of an alkaline earth metal oxide and rotating the vessel until the pressure stabilizes above zero gauge.

11. A method for producing non-colloidal alkaline earth metal carbonates in finely divided, generally spheroidal form comprising the steps of preparing an aqueous suspension of an alkaline earth metal by mixing into water one of the forms of alkaline earth metals taken from the group comprising alkaline earth metal oxides and alkaline earth metal hydroxides, introducing said suspension into a reaction vessel, introducing carbon dioxide gas under pressure into said reaction vessel, rotating said vessel and maintaining carbon dioxide under pressure in the vessel until substantially all of the alkaline earth metal has been carbonated, as evidenced by a stabilization of the pressure in said vessel at some point above zero gauge.

12. A method according to claim 1 in which said aqueous suspension of calcium hydroxide is preheated to 60° C.

13. A method according to claim 1 in which said calcium hydroxide is introduced into the bottom of the reaction vessel.

14. A method for producing non-colloidal calcium carbonate in finely divided, generally spheroidal form comprising the steps of introducing carbon dioxide under pressure into a reaction vessel containing an aqueous suspension of calcium hydroxide and rotating the vessel until the pressure stabilizes above zero gauge.

References Cited by the Examiner
UNITED STATES PATENTS
3,150,926   9/1964   Pope et al. _____ 23—66

OSCAR R. VERTIZ, *Primary Examiner.*

G. OZAKI, *Assistant Examiner.*